(12) United States Patent
Ofstad et al.

(10) Patent No.: US 9,213,422 B2
(45) Date of Patent: Dec. 15, 2015

(54) METHOD OF AUTOMATICALLY MOVING A CURSOR WITHIN A MAP VIEWPORT AND A DEVICE INCORPORATING THE METHOD

(75) Inventors: Andrew Ofstad, San Francisco, CA (US); Su Chuin Leong, South San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 463 days.

(21) Appl. No.: 13/584,487

(22) Filed: Aug. 13, 2012

(65) Prior Publication Data

US 2015/0185873 A1    Jul. 2, 2015

(51) Int. Cl.
*G06T 15/00* (2011.01)
*G06F 17/30* (2006.01)
*G06F 3/0481* (2013.01)
*G06F 3/0346* (2013.01)

(52) U.S. Cl.
CPC .......... *G06F 3/0346* (2013.01); *G06F 3/04812* (2013.01); *G06F 3/04815* (2013.01); *G06F 17/30241* (2013.01)

(58) Field of Classification Search
CPC ......... G06T 15/00; G06T 15/10; G06T 17/00; G06T 17/20; G06T 19/00
See application file for complete search history.

(56) References Cited

U.S. PATENT DOCUMENTS

| | | | |
|---|---|---|---|
| 5,949,351 A * | 9/1999 | Hahm | 340/4.42 |
| 2003/0182052 A1* | 9/2003 | DeLorme et al. | 701/201 |
| 2005/0057497 A1* | 3/2005 | Kawahara | 345/157 |
| 2008/0036738 A1* | 2/2008 | Balakrishnan et al. | 345/158 |
| 2009/0033552 A1* | 2/2009 | Kirmuss et al. | 342/357.08 |
| 2013/0055125 A1* | 2/2013 | Jackson et al. | 715/769 |
| 2013/0125066 A1* | 5/2013 | Klein et al. | 715/862 |
| 2013/0326425 A1* | 12/2013 | Forstall et al. | 715/851 |

OTHER PUBLICATIONS

Anguelov et al., "Google Street View: Capturing the World at Street Level," Computer, 43:32-38 (2010).
Whitney, "Microsoft Enhances its Bing Streetside View," (2011). Retrieved from the Internet on Dec. 2, 2014: URL:http://www.cnet.com/news/microsoft-enhances-its-bing-streetside-view/.

* cited by examiner

*Primary Examiner* — Xiao Wu
*Assistant Examiner* — Michelle Chin
(74) *Attorney, Agent, or Firm* — Marshall, Gerstein & Borun LLP

(57) ABSTRACT

The present disclosure relates to devices and methods for automatically moving a cursor within a map viewport. More specifically, the present disclosure relates to devices and methods that determine a location of various objects within a 3D scene displayed within a map viewport and determining a location of a 3D cursor within the 3D scene. When a distance between an object location and the 3D cursor location is less than a threshold distance, the geometric shape data of the 3D cursor is automatically modified to at least partially surround the object. The location of the object may be determined based on data representative of the 3D scene. The location of the 3D cursor may be determined based on data representative of the 3D cursor location.

20 Claims, 8 Drawing Sheets

METHOD OF AUTOMATICALLY MOVING A CURSOR WITHIN A MAP VIEWPORT AND A DEVICE INCORPORATING THE METHOD

FIELD OF THE DISCLOSURE

The present disclosure relates to devices and methods for automatically moving a cursor within a map viewport. More specifically, the present disclosure relates to devices and methods that determine a location of objects within a 3D scene based on data representative of the 3D scene, that determine when a location of a 3D cursor is less than a threshold distance from an object and that automatically move the 3D cursor to the object location when the 3D cursor location is less than the threshold distance from the object location.

BACKGROUND

Geographic mapping applications represent some of the most frequently used applications within computing environments. The content of the geographic maps often includes information related to various attributes of the geographic region being viewed. Information related to continents, countries, states, providences, counties, municipalities, neighborhoods, businesses, services and the like, is often provided along with a geographic map.

More recently, databases that store data representative of three dimensional views of various objects, such as buildings, physical facilities, natural formations, landmarks, etc. are becoming available. The content of any given three dimensional image database may be developed and maintained by an entity associated with a corresponding geographic region. The data associated with geometric shapes representative of associated three dimensional points of interest objects is often provided along with geographic map data.

SUMMARY

A method is provided to automatically move a 3D cursor within a 3D scene displayed within a map viewport on a client computing device by modifying geometric shape data associated with the cursor. The method includes receiving data representative of a 3D scene via a computer network, wherein the 3D scene comprises at least one object and the object includes location data and image data. The method may also include determining an object location within the 3D scene based on the received data and determining a 3D cursor location within the 3D scene based on 3D cursor location data. The method may also include determining a distance between the object location and the 3D cursor location within the 3D scene and determining that the distance is less than a threshold distance. The method may then automatically modify geometric shape data of the 3D cursor displayed within the map viewport to surround the object in response to determining that the distance between the object location and the 3D cursor location is less than the threshold distance.

In another embodiment, a computing device is provided that is configured to automatically move a 3D cursor within a 3D scene displayed within a map viewport on a computing device by modifying geometric shape data associated with the cursor. The computing device may include a cursor positioning device and a first routine stored on a memory including instructions that, when executed on a processor, receives data representative of a 3D scene via a computer network. The 3D scene may comprise a plurality of objects that each include location data and image data. The computing device may also include a second routine stored on a memory including instructions that, when executed on a processor, determine an object location within the 3D scene based on the received data. The computing device may further include a third routine stored on a memory including instructions that, when executed on a processor, determine a 3D cursor location within the 3D scene based on 3D cursor location data. The computing device may also include a fourth routine stored on a memory including instructions that, when executed on a processor, determine a distance between the object location and the 3D cursor location within the 3D scene. The computing device may further include a fifth routine stored on a memory including instructions that, when executed on a processor, determine that the distance is less than a threshold distance as the cursor positioning device positions the 3D cursor within the 3D scene. The computing device may also include a sixth routine stored on a memory that, when executed on a processor, automatically modifies geometric shape data of the 3D cursor within the 3D map viewport to at least partially surround the identified object in response to the distance between the 3D cursor location and the object location being less than the threshold distance.

In yet a further embodiment, a non-transitory computer-readable medium may store instructions for automatically moving a 3D cursor within a 3D scene displayed within a map viewport on a client computing device by modifying geometric shape data associated with the cursor. The non-transitory computer-readable medium may include a first routine that, when executed on a processor, causes the client computing device to receive data representative of a 3D scene via a computer network. The 3D scene may include a plurality of objects that each include location data and image data. The non-transitory computer-readable medium may also include a second routine that, when executed on a processor, causes the client computing device to determine an object location within the 3D scene based on the received data. The non-transitory computer-readable medium may further include a third routine stored on a memory including instructions that, when executed on a processor, determine a 3D cursor location within the 3D scene based on 3D cursor location data. The non-transitory computer-readable medium may also include a fourth routine including instructions that, when executed on a processor, cause the client computing device to determine a distance between the object location and a 3D cursor location within the 3D scene. The non-transitory computer-readable medium may further include a fifth routine including instructions that, when executed on a processor, cause the client computing device to determine that the distance is less than a threshold distance as the cursor positioning device positions the 3D cursor within the 3D scene. The non-transitory computer-readable medium may also include a sixth routine that, when executed on a processor, causes the client computing device to automatically modify geometric shape data of the 3D cursor within the 3D map viewport to at least partially surround the object in response to the distance between the 3D cursor location and the object location being less than the threshold distance.

The features and advantages described in this summary and the following detailed description are not all-inclusive. Many additional features and advantages will be apparent to one of ordinary skill in the art in view of the drawings, specification and claims hereof.

DETAIL DESCRIPTION

Figure 1A:
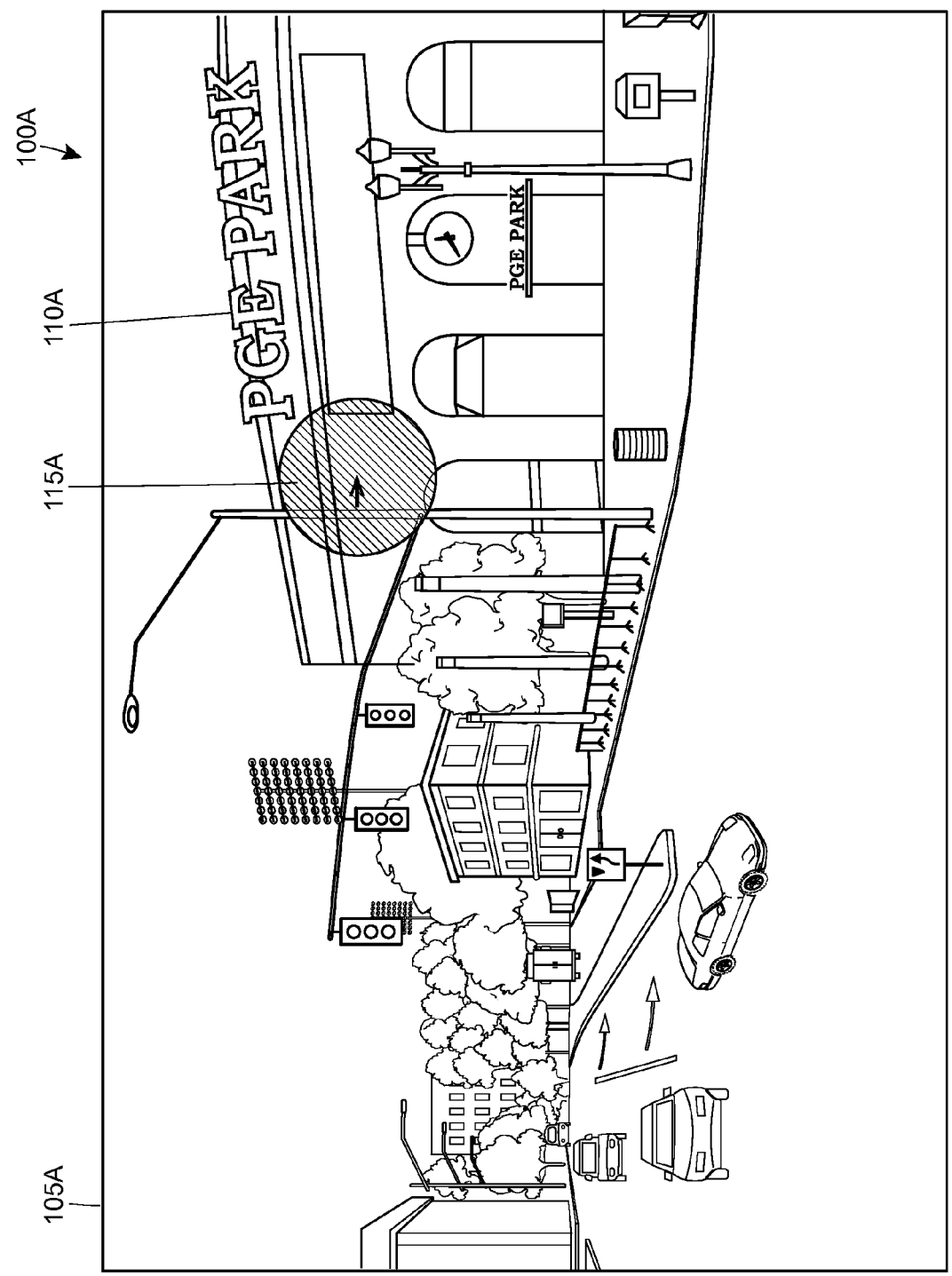
FIG. 1A depicts a display of a 3D scene within a map viewport including a plurality of objects and a 3D cursor prior to being automatically moved to a proximate object.

Viewing of geographic maps on a display of a computing device has become common. Using a cursor positioning device (e.g., a mouse) to navigate around within the geographic maps is equally common. When a user navigates around within a scene that includes objects, she may find difficulty when attempting to identify points of interest within the scene for which additional information may be available. Navigation within a 3D scene may be particularly difficult. The present devices and methods provide automatic movement of a 3D cursor within a scene that indicates to a user when an object (e.g., a point of interest object, map feature, buildings, physical facilities, natural formations, landmarks, etc.) is present within the scene. When a user moves a 3D cursor around within a display of a scene using a cursor positioning device, the 3D cursor may automatically move to an object when a distance between a 3D cursor location and an object location is less than a threshold distance. The 3D cursor may automatically move with a rapid change in location, such that the 3D cursor "snaps" to the object location. Rapid automatic movement of a 3D cursor may be more perceivable by the user when compared to a gradual 3D cursor movement. Additionally, or alternatively, a portion of the 3D cursor, such as an arrow for example, may be reoriented to a surface of the object subsequent to automatic movement of the 3D cursor. The 3D cursor orientation may indicate to the user a view of the object that will be displayed when an indication of a user selection of the object is received via the cursor positioning device. A user may select an object by actuating an input feature of a cursor positioning device (e.g., a button on a mouse).

A 3D cursor may define a "pancake" shape in addition to, or in lieu of, an arrow. The 3D cursor may be configured to encompass, or surround, the object to further identify the presence of the object to the user. In addition to rapid movement, a change in the geometric shape of the 3D cursor may indicate automatic movement of the 3D cursor. For example, the 3D cursor geometric shape may change from a first geometric shape, such as a pancake shape, to a second geometric shape, such as a square shape, a rectangle shape, a circular shape, an ovular shape, etc. A change of the geometric shape of a 3D cursor may further indicate the presence of an object within the scene. The 3D cursor may acquire a shape based on the geometry of the scene over which the 3D cursor is currently located (i.e., the 3D cursor may appear to drape over the contour of the scene or an object within the scene, for example).

Automatic movement of a 3D cursor, orientation of a 3D cursor and change of geometric shape of a 3D cursor with regard to objects within a 3D scene is particularly useful when the 3D scene is heavily populated with a plurality of features. These 3D cursor features are especially beneficial when the objects are otherwise difficult to distinguish from the remainder of the 3D scene.

A processor, such as processor 225 of FIG. 1A, may render a 3D scene and 3D geometric shapes (i.e., a 3D cursor and 3D object) within the 3D scene on a 2D display using an isometric projection. In another implementation, the processor 225 may render the 3D geometric shapes on a 2D display using a two point perspective. More generally, the processor 225 may render a display using any desired level of detail to illustrate a 3D cursor and objects for which 3D geometry data is available. The isometric projections, two point perspectives and any other rendering may be based on either (x, y) coordinate data or (x, y, z) coordinate data.

FIGS. 1A-1D depict a sequence of displays that illustrate automatic movement of a 3D cursor within a scene. FIG. 1A depicts a display of a 3D scene 105A within a map viewport 100A including an object 110A and a 3D cursor 115A prior to the processor 225 automatically modifying geometric shape data of the 3D cursor 115A to at least partially surround the object 110A. Prior to the processor 225 automatically modifying geometric shape data of the 3D cursor to at least partially surround an object, the processor 225 may automatically orient an arrow, that forms a part of the 3D cursor, based on a direction in which a user is currently moving an associated 3D cursor positioning device. Alternatively, automatic orientation of the arrow may indicate a direction to an object within the scene that is nearest to the current location of the 3D cursor.

Figure 1B:
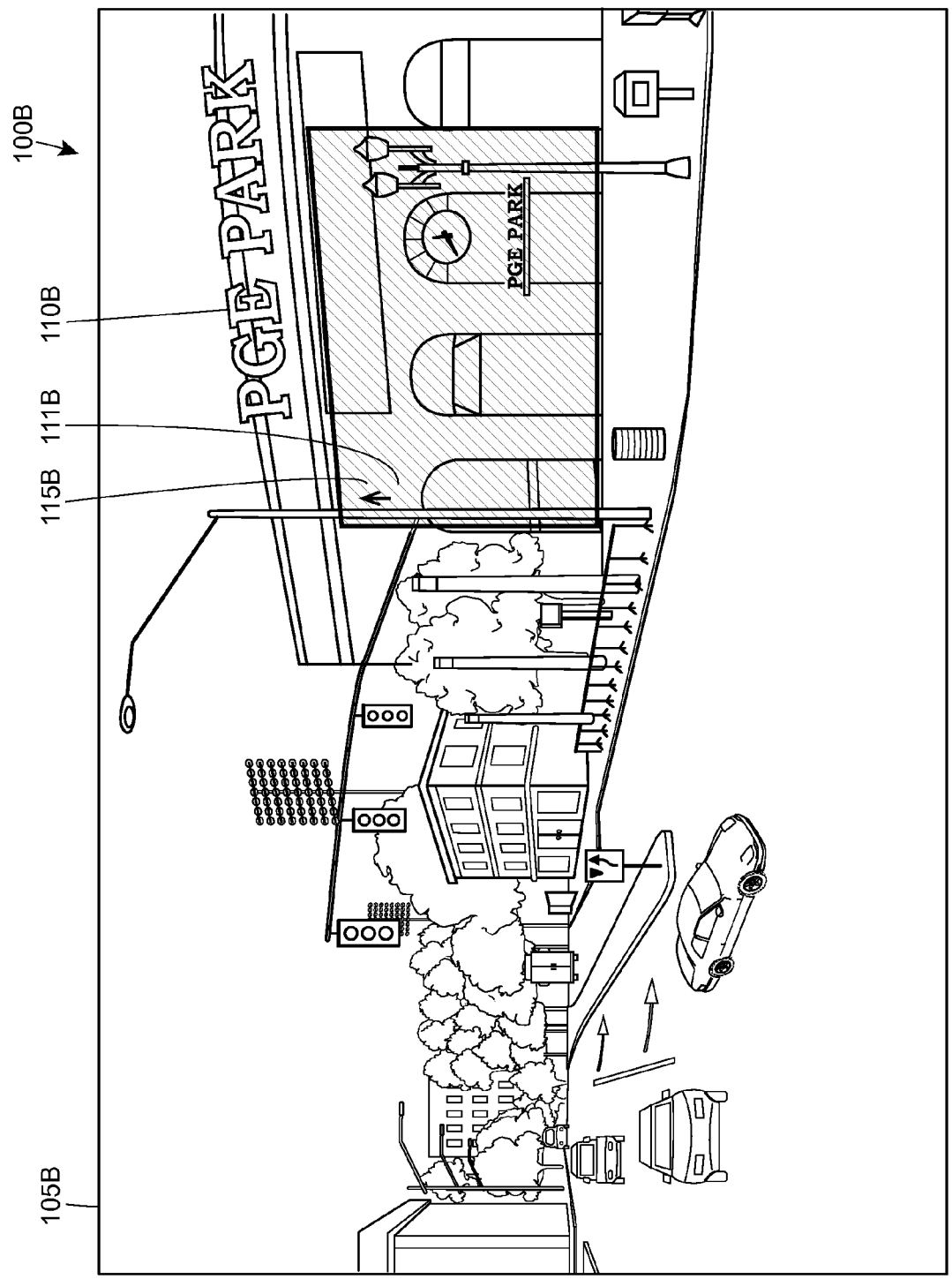
FIG. 1B depicts a display of a 3D scene within a map viewport including a plurality of objects and a 3D cursor subsequent to being automatically moved to a proximate object.

FIG. 1B depicts a display of a 3D scene 105B (which is similar to the 3D scene 105A of FIG. 1A) within a map viewport 100B including an object 110B (which is the same as object 110A of FIG. 1A) and a 3D cursor 115B subsequent to the processor 225 automatically modifying geometric shape data of the 3D cursor 115B to at least partially surround the object 110B. As can be seen from FIGS. 1A and 1B, the 3D cursor 115A (which includes an arrow within a pancake geometric shape) changes to the 3D cursor 115B (which includes an arrow oriented toward a surface 111B of the object 110B, along with a square geometric shape that encompasses a portion of the object 110B).

Figure 1C:
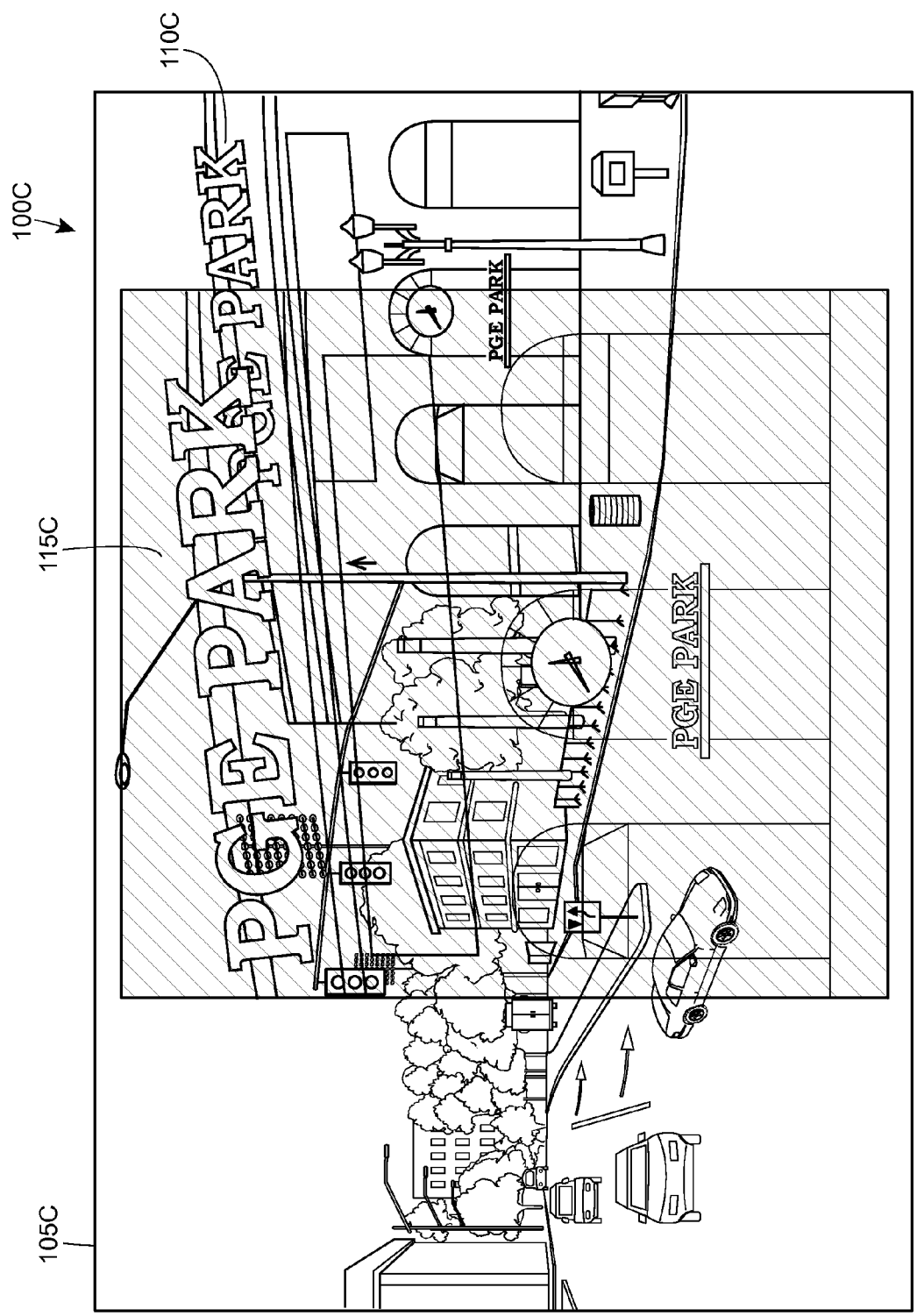
FIG. 1C depicts a transition display including a 3D scene within a map viewport including a plurality of objects with a semi-transparent display of a best available view of an object superimposed over the 3D scene along with a 3D cursor subsequent to being automatically moved to the object and subsequent to receiving an indication of a user selection of the object.

FIG. 1C depicts a transition display 105C including a 3D scene (similar to 3D scene 105A of FIG. 1A) within a map viewport 100C including an object (which is similar to the object 110A of FIG. 1A) with a semi-transparent display of a best available view of an object 110C (which is the same as the object 110A of FIG. 1A and the object 110B of FIG. 1B) superimposed over the 3D scene (which is similar to 3D scene 105A of FIG. 1A) along with a 3D cursor 115C subsequent to automatic movement of the 3D cursor 115B of FIG. 1B to the object and subsequent to receiving an indication of a user selection of the object 110B of FIG. 1B.

Figure 1D:
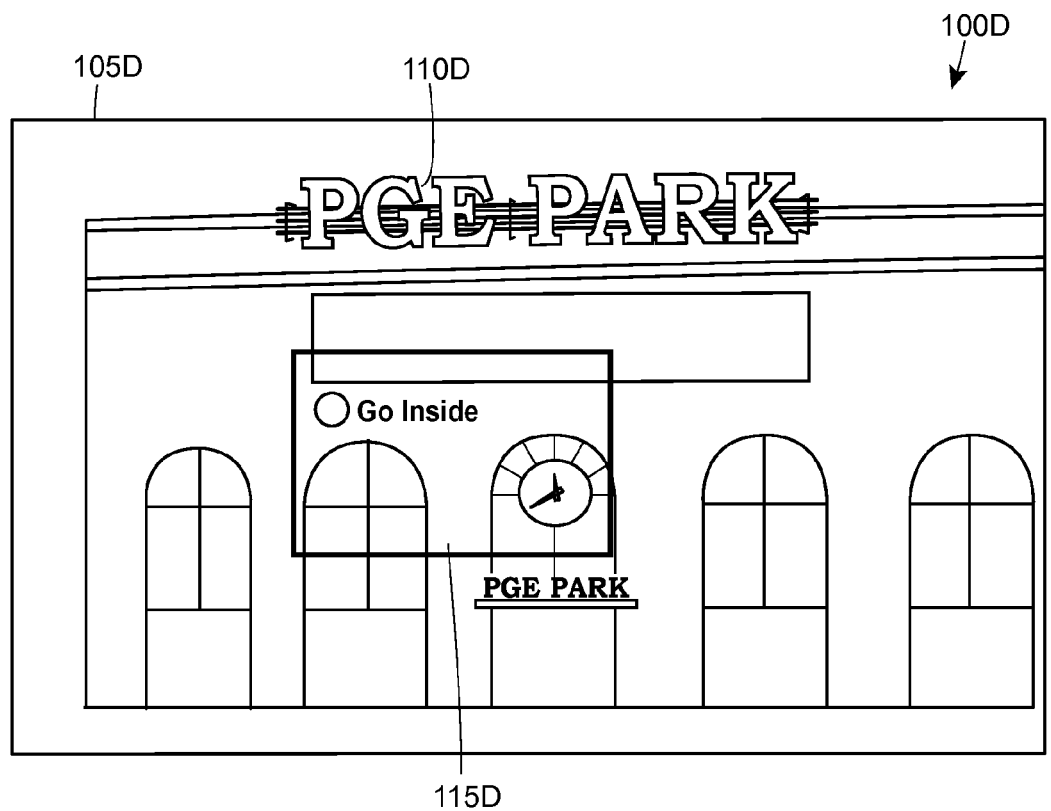
FIG. 1D depicts a display of a best available view of an object along with a 3D cursor subsequent to being automatically moved to the object, subsequent to a user receiving an indication of a user selection of the object and subsequent to the transition display of FIG. 1C.

FIG. 1D depicts a display 105D of a best available view of an object 110D (which is the same as the object 110A of FIG. 1A, the object 110B of FIG. 1B and the object 110C of FIG. 1C) along with a 3D cursor 115D after the processor 225 automatically modifies geometric shape data of the 3D cursor 115B of FIG. 1B, subsequent to the processor 225 receiving an indication of a user selection of the object 110B of FIG. 1B and subsequent to the processor 225 generating the transition display of FIG. 1C. As can be seen from FIG. 1D, the 3D cursor 115D indicates to a user that actuating an associated cursor positioning device will display an image of the inside of the object 110D (e.g., text, such as "go inside" may be added to provide this indication as illustrated in FIG. 1D). In some embodiments, the cursor 115D may indicate the availability of further data corresponding to the object as described in conjunction with FIG. 2B.

Figure 2A:
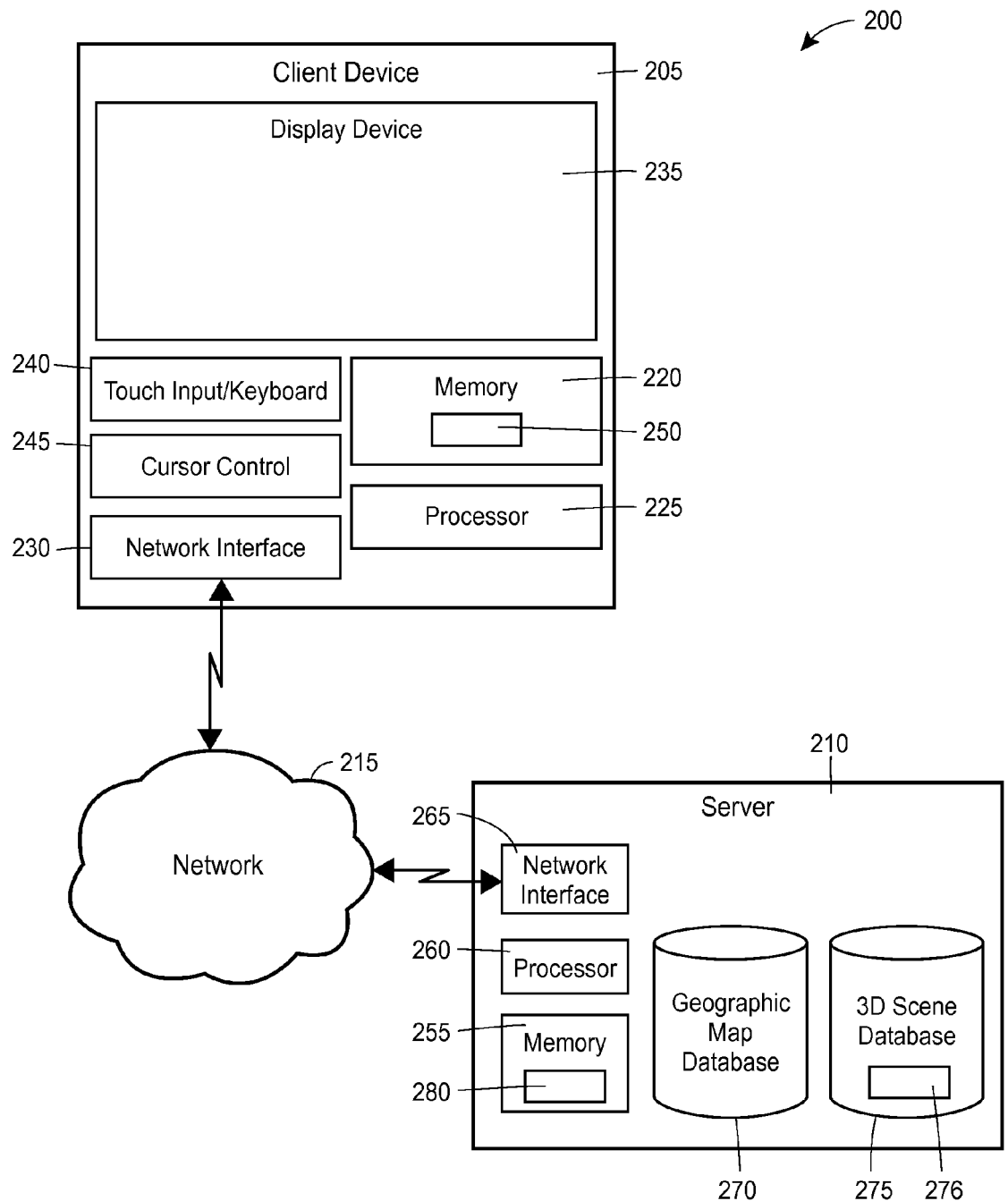
FIG. 2A depicts a high-level system diagram representing an example computer network for providing a user of a computing device a display of a 3D scene having a plurality of objects and a 3D cursor where the 3D cursor automatically moves to an object when the 3D cursor is moved within a threshold distance from the object.

Turning to FIG. 2A, a high-level system diagram depicts an example computer network 200 for automatically moving a 3D cursor within a display of a scene that provides a user of a client device 205 an indication that an object is located within the scene. For clarity, only one client device 205 is depicted. It should be understood that any number of client devices may be supported and that any given client device may be an appropriate computing device, such as a desk-top computer, a mobile telephone, a personal data assistant, a lap-top computer, a vehicle-based computer system, etc. The client device 205 may include a memory 220 and a processor 225 for storing and executing, respectively, various modules 250 related to automatically moving a 3D cursor within a display of a scene. A display device 235 for any particular client device 205 may be any appropriate type of electronic display device such as a liquid crystal display (LCD), a light emitting diode (LED) display, a plasma display, a cathode ray tube (CRT) or any other type of known or suitable display. The client device 205 may include a cursor control 245, such as a 2D cursor positioning device (e.g., a mouse). It should be understood that the cursor control 245 may alternatively be a 3D cursor positioning device. The client device 205 may include a touch input/keyboard 240, such as a standard keyboard or a touch-screen input. It should be understood that a touch-screen input device may be incorporated within the display device 235, for example. The client device 205 is communicatively coupled to a remote server 210 via a wireless communications network 215. The client device 205 may also include a network interface 230 to facilitate communications between the client device 205 and the remote server 210 via any wireless communication network 215, including for example a wireless LAN, MAN or WAN, WiFi, the Internet, or any combination thereof. Moreover, the client device 205 may be communicatively connected to the server 205 via any suitable communication system, such as via any publicly available or privately owned communication network, including those that use wireless communication structures, such as wireless communication networks, including for example, satellite and cellular telephone communication systems, etc. A client device 3D cursor automatic movement module 250 may be stored on the memory 220. The client device 3D cursor automatic movement module 250 may include instructions that, when executed on the processor 225, may retrieve data representative of a 3D scene having a plurality of objects, determine a location of a 3D cursor and a location of an object and automatically modifying geometric shape data of the 3D cursor to at least partially surround the object when a distance between the 3D cursor location and the object location is less than a threshold distance, for example. It should be understood that at least a portion of the instructions or functions described as being performed by execution of the client device 3D cursor automatic movement module 250 may be performed by execution of a server 3D cursor automatic movement module 280. For example, a location of an object may be determined by execution of the server 3D cursor automatic movement module 280 and communicated to the client device 205.

The remote server 210 may include a memory 255 and a processor 260 for storing and executing, respectively, various modules 280 that facilitate communications between the remote server 210 and the client device 205 via a network interface 265 and the network 215. The remote server 210 may also include a geographic map database 270 for storing information related to geographic maps and a 3D scene database 275 for storing data and information representative of 3D scene having a plurality of objects. The 3D scene database 275 may include a data structure 276 that defines various characteristics of 3D scenes, 3D cursors and points of image objects as is described in detail with reference to FIG. 2B. A server 3D cursor automatic movement module 280 may be stored on the memory 255 and may include instructions to retrieve 3D scene data and determine locations of associated objects, for example. Alternatively, the server 3D cursor movement module 280 may provide geographic map data and 3D scene data to the client device 205. It should be understood that the geographic map database 270 and/or the 3D scene database 275 may be stored on a memory remote from the server 210, as well as being remote from the client device 205. It should also be understood that at least portions of the geographic map database 270 and/or the 3D scene database 275 may be stored on a memory 220 within a client device 205.

Figure 2B:
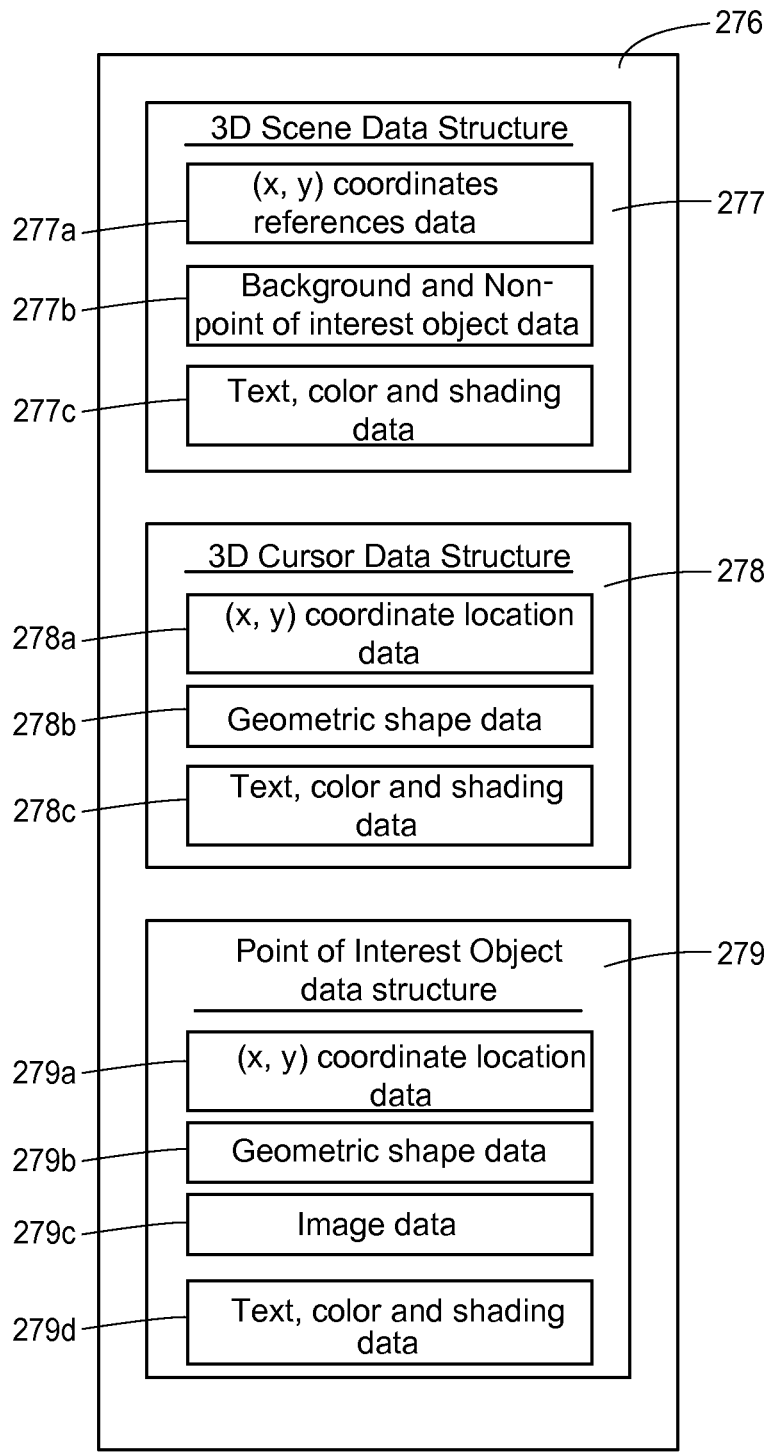
FIG. 2B depicts a data structure for a 3D scene, a 3D cursor and objects.

With reference to FIG. 2B, a data structure 276 may include a 3D scene data structure 277, a 3D cursor data structure 278 and a points of image object data structure 278. The data structure 276 may be similar to the data structure 276 of FIG. 2A and stored in a 3D scene database similar to 3D scene database 275 of FIG. 2A. The 3D scene data structure 277 may include data that defines a (x, y) coordinate reference for a map view 277a, such as map viewport 100A of FIG. 1A, for example. The (x, y) coordinate reference 277a may be used to determine the location of objects within the map viewport and to determine a corresponding 3D cursor location. The 3D scene data structure 277 may also include data that defines non-objects 277b within a 3D scene, such as roadways, text labels, street lights, street signs, trees, vehicles, buildings, landmarks etc. The 3D scene data structure 277 may further include data that defines colors and shading 277c within the 3D scene. The 3D scene data structure 277 may include (x, y, z) coordinate data that defines at least a portion of a 3D scene in addition to, or in lieu of (x, y) coordinate data.

The 3D cursor data structure 278 may include data that defines an (x, y) coordinate location of a 3D cursor 278a, such as the 3D cursor 115A of FIG. 1A. A processor, such as processor 225 of FIG. 1A, may execute instructions to reference the (x, y) coordinate location data of the 3D cursor 278a to the (x, y) coordinate reference 277a of the 3D scene data structure 277 such that the processor 225 may execute further instructions to determine a relative (x, y) coordinate location. The 3D cursor data structure 278 may also include data that represents various characteristics of a 3D cursor 278b, such as a geometric shape of the 3D cursor or geometric shapes included as a part of a 3D cursor, such as an arrow, a square box, a pancake shape, etc. The 3D cursor data structure 278 may further include data 278c that defines text to be included as a part of a 3D cursor, data that defines the color of various features of a 3D cursor and data that defines shading of various features of a 3D cursor. As described elsewhere herein, various characteristics of a 3D cursor, such as an arrow orientation or a 3D cursor geometric shape may indicate the presence of an object, such as the object 110A of FIG. 1A within a 3D scene, such as the 3D scene 105A of FIG. 1A. Automatic movement of a 3D cursor, orientation of a 3D cursor and change of geometric shape of a 3D cursor with regard to objects within a 3D scene is particularly useful when the 3D scene is heavily populated with a plurality of features. The 3D cursor data structure 278b may also include (x, y, z) coordinate data that defines at least a portion of a 3D cursor in addition to, or in lieu of (x, y) coordinate data.

The object data structure 279 may include data that defines an (x, y) coordinate location of an object 279a, such as object 110A of FIG. 1A A processor, such as processor 225 of FIG. 1A may execute instructions to reference the (x, y) coordinate location data of the object 279a to the (x, y) coordinate reference 277a of the 3D scene data structure 277 such that the processor 225 may execute instructions to determine a relative (x, y) coordinate location. When the processor 225 executes instructions to reference both the (x, y) coordinate location of a 3D cursor 278a and an object 279a to a (x, y) coordinate of a 3D scene 277a, the processor 225 may also execute instructions to determine a distance between the 3D cursor location and the object location using the associated (x, y) coordinates. The object data structure 279 may also include data that defines a geometric shape of objects 279b, such as the object 110A of FIG. 1A. The object data structure 279 may further include data that represents various imagery of objects 279c, such as various perspective views of the objects. The object data structure 279 may yet further include data 279d that defines colors and shading of various objects. The object data structure 279 may include (x, y, z) coordinate data that defines at least a portion of an object in addition to, or in lieu of (x, y) coordinate data.

In operation, a user of a computing device, such as the client device 205 depicted in FIG. 2A, may cause a computing device to launch a 3D scene viewing application by any known mechanism (e.g., the user may select a corresponding icon included on a touch screen display, or, the 3D scene viewing application may be configured to automatically run as a background task when the client device is powered on, etc.). The computing device receives data representative of a 3D scene via a computer network where the scene includes a plurality of objects. The computing device may determine a location of an object within the 3D scene based on the received data, determine a location of a 3D cursor within the scene, and automatically modify geometric shape data of the 3D cursor to at least partially surround the object location when a distance between the 3D cursor location and the object location is less than a threshold distance. The computer device may then access an object, such as object 110A, for example, to generate a display of various data associated with the object. In some embodiment, the computer device may display a view, such as best available view 105D of FIG. 1D, for example, of the object 110A.

Figure 3:
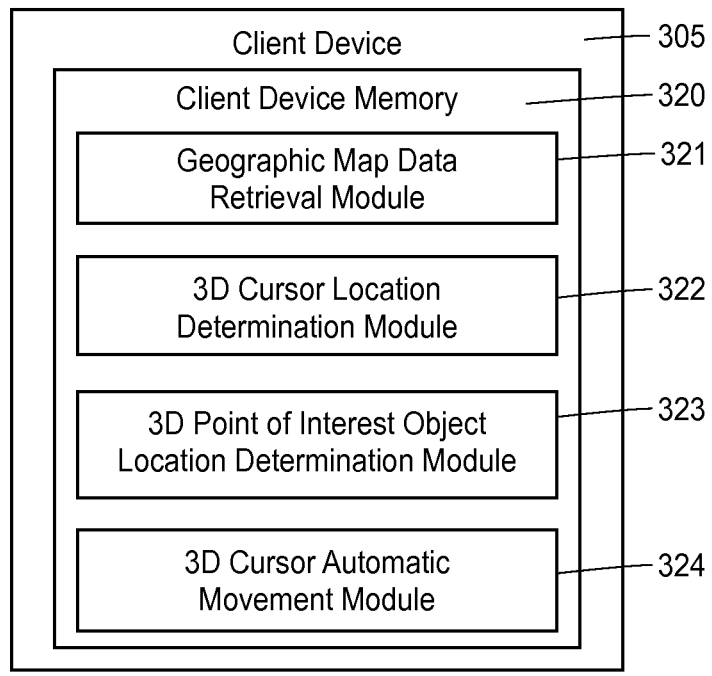
FIG. 3 depicts an example computing device with various modules for use in providing a user a display of a 3D scene having a plurality of objects and a 3D cursor where the 3D cursor automatically moves to an object when the 3D cursor is moved within a threshold distance from the object.

Turning to FIG. 3, a client device 305, which may be similar to the client device 205 of FIG. 2A, is depicted to include various modules 321, 322, 323, 324 stored on a memory 320 related to automatically moving a 3D cursor within a scene. The modules 321, 322, 323, 324 may, for example, be included within a client device 3D cursor automatic movement module 250 as depicted in FIG. 2A. While the modules 321, 322, 323, 324 stored on the memory 320 will be described as being executed on a processor similar to processor 225 of FIG. 2A, it should be understood that the modules 321, 322, 323, 324 may be executed on any suitable processor. A geographic map data retrieval module 321 may be stored on the memory 320 that, when executed on the processor 225, may retrieve 3D scene data from a 3D scene database 275 of FIG. 2A, for example. The 3D scene data may be stored on a remote server, such as server 210 of FIG. 2A, for example, or may be at least in part, stored on the memory 320 within the client device 305. The 3D scene data may include information related to each object, such as object 110A of FIG. 1A, for example, within a 3D scene, such as an object (x, y coordinate) location data, best available view data for the object, and other data as described in relation to FIG. 2B, above. A 3D cursor location determination module 322 may be stored on the memory 320 that, when executed on the processor 225, determine a location of a 3D cursor within the 3D scene. A 3D object location determination module 323 may be stored on the memory 320 that, when executed on the processor 225, may determine a (x, y coordinate) location for each object within the 3D scene. A 3D cursor automatic movement module 324 may be stored on the memory 320 that, when executed on the processor 225, may orient a display of a 3D scene within a map viewport such that desired view of a surface of an object is depicted (e.g., as depicted in FIG. 1C).

Figure 4:
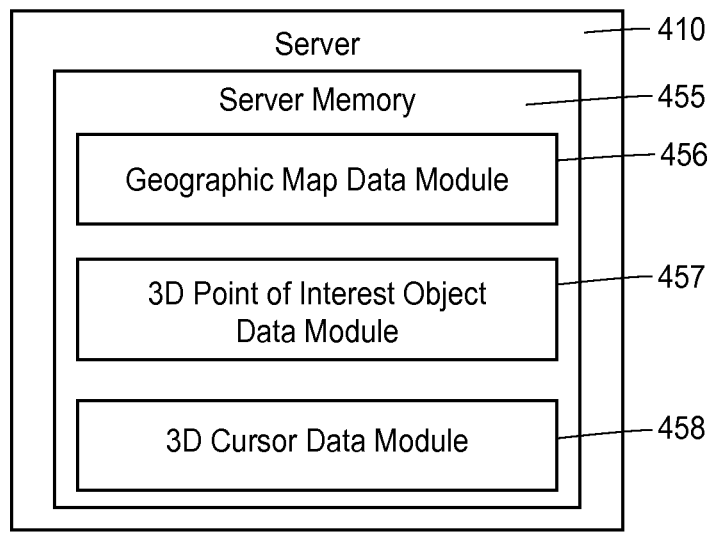
FIG. 4 depicts an example server with various modules for generating data for use in providing a user of a computing device a display of a 3D scene having a plurality of objects and a 3D cursor where the 3D cursor automatically moves to an object when the 3D cursor is moved within a threshold distance from the object.

Turning to FIG. 4, a server 410, which may be similar to the server 210 of FIG. 2A, is depicted to include various modules 456, 457, 458 stored on a memory 455 related to automatically moving a 3D cursor within a scene. The modules 456, 457, 458 may, for example, may include instructions within a server automatic 3D cursor movement module 280 as depicted in FIG. 2A. While the modules 456, 457, 458 stored on the memory 455 will be described as being executed on a processor similar to processor 260 of FIG. 2A, it should be understood that the modules 456, 457, 458 may be executed on any suitable processor. A geographic map data module 456 may be stored on the memory 455 that, when executed on the processor 260, retrieves geographic map data from a geographic map database, such as the geographic map database 270 of FIG. 2A, and communicates the geographic map data to a client device, such as the client devices 205, 305 of FIGS. 2A and 3, respectively. It should be understood that the geographic map data may be, at least in part, stored on a second server that is remote from the server 410. A 3D object data module 457 may be stored on the memory 455 that, when executed on the processor 260, retrieves data representative of objects, such as object 110A of FIG. 1A, for example, from a 3D object database, such as the 3D object database 275 of FIG. 2A, and communicates the points of interest data to a client device, such as the client devices 205, 305 of FIGS. 2A and 3, respectively. The objects data stored in the 3D object database may include information related to each object, such as an object (x, y coordinate) location, image data representative of a best available view of each object, and other data as described above in relation to FIG. 2B. A 3D cursor data module 458 may be stored on the memory 455 that, when executed on the processor 260, may provide data to a client device, such as the client devices 205, 305 of FIGS. 2A and 3, respectively, that defines a 3D cursor geometric shape and appearance, for example.

Figure 5:
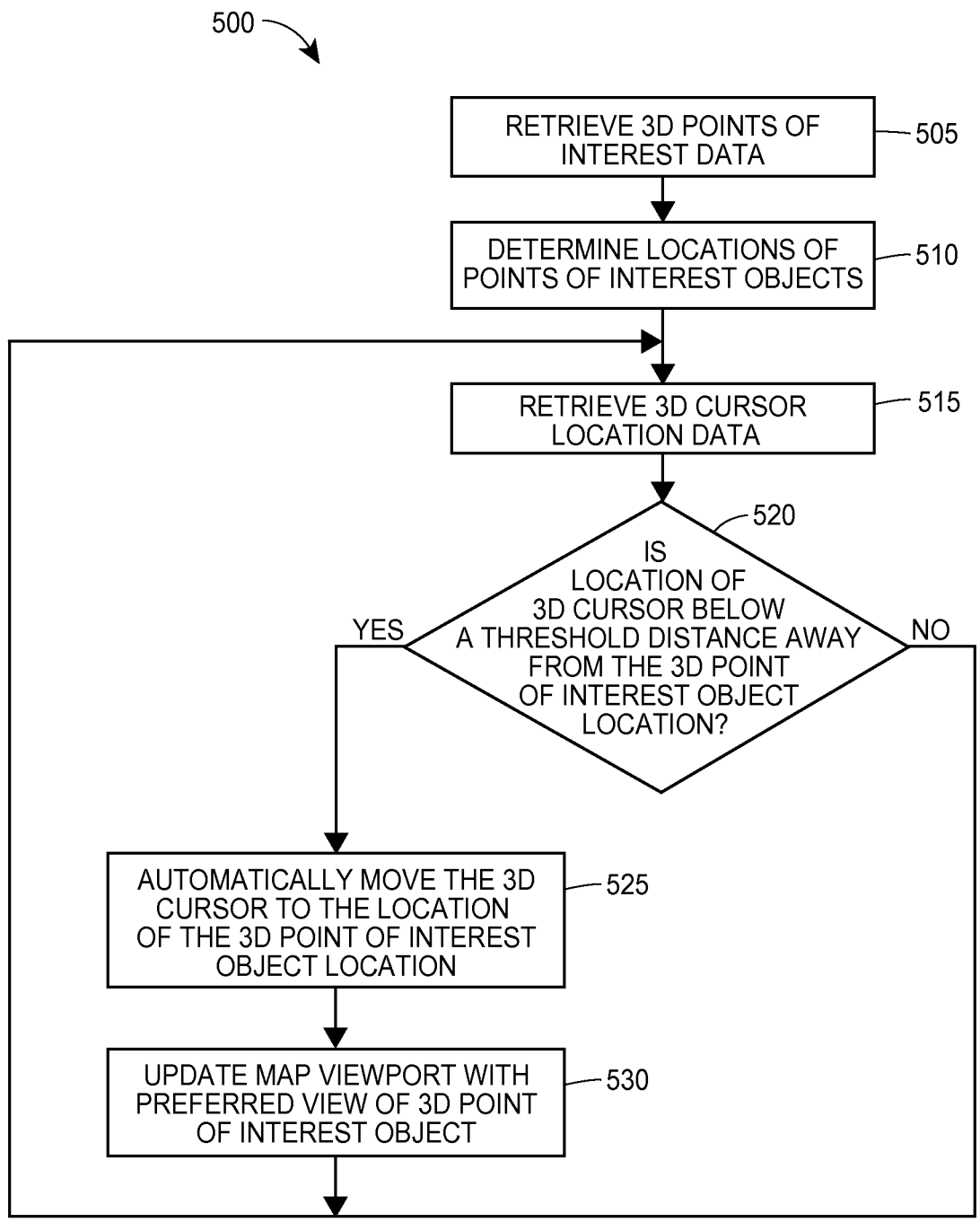
FIG. 5 depicts a flow diagram of a method for providing a user of a computing device a display of a 3D scene having a plurality of objects and a 3D cursor where the 3D cursor automatically moves to an object when the 3D cursor is moved within a threshold distance from the object.

With reference now to FIG. 5, a flow diagram is depicted for a method 500 to automatically modify geometric shape data of a 3D cursor within a scene. The method 500 may be implemented by execution of module 250 of FIG. 2A, for example, or may be implemented by execution of modules 321, 322, 323, 324 of FIG. 3. The method 500 may also be at least partially implemented by execution of module 280 of FIG. 2A or execution of modules 456, 457, 458 of FIG. 4, for example. While at least a portion of the method 500 may be implemented by execution of modules on a processor similar to processor 260 of FIG. 2A, the ensuing description refers to the execution of the various modules as being performed on a processor similar to processor 225 of FIG. 2A. In any event, the processor 225 may retrieve 3D objects data from a 3D point of interest database, such as database 275 of FIG. 2A, in block 505. The 3D object data may include data representative of a (x, y coordinate) location of each object within a scene, image data representative of a best available view of each object, and other data as described herein. The processor 225 determines (x, y coordinate) locations for each object within the scene in block 510. The processor 225 retrieves a 3D cursor (x, y coordinate) location from a 3D cursor positioning device in block 515. The processor 225 makes a determination as to whether the 3D cursor location is less than a threshold distance from an object location in block 520. As described with reference to FIG. 2B, the 3D scene data structure 277 may include (x, y) coordinates reference data 277a. The processor 225 may establish a common (x, y) coordinate reference for both the 3D cursor (x, y) coordinate location data 278a and the object (x, y) coordinate location data 279a based on the 3D scene (x, y) coordinates reference data 277a. The processor 225 may determine a 3D cursor location based on the 3D cursor (x, y) coordinate location data 278a and determine an object location based on the object (x, y) coordinate location data 279a. When the processor 225 determines that the 3D cursor location is not less than a threshold distance from an object location in block 520, the flow returns to block 515. When the processor 225 determines that the 3D cursor is less than a threshold distance from an object in block 520, the processor 225 automatically modifies geometric shape data of the 3D cursor to at least partially surround the object in block 525. Subsequent to the processor 225 automatically modifying geometric shape data of the 3D cursor in block 525, the processor 225 updates a display based on point of interest data. In some embodiments, the processor 225 updates the display based on data representative of a best available view of the corresponding object in block 530.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of components, modules, or mechanisms. Modules may constitute either software modules or hardware modules. A hardware module is tangible unit capable of performing certain operations and may be configured or arranged in a certain manner. In example embodiments, one or more computer systems (e.g., a standalone, display or server computer system) or one or more hardware modules of a computer system (e.g., a processor or a group of processors) may be configured by software (e.g., an application or application portion) as a hardware module that operates to perform certain operations as described herein.

In various embodiments, a module may be implemented mechanically or electronically. For example, a module may comprise dedicated circuitry or logic that is permanently configured (e.g., as a special-purpose processor, such as a field programmable gate array (FPGA) or an application-specific integrated circuit (ASIC)) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods, modules and routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for devices and a method for automatically moving a cursor within a map viewport through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method to automatically move a 3D cursor within a 3D scene displayed within a map viewport on a client computing device, the method comprising:
   receiving data representative of a 3D scene via a computer network, wherein the 3D scene comprises at least one object, the object including location data and image data, wherein the object is configured to convey information to a user;
   determining an object location within the 3D scene based on the received data;
   determining a 3D cursor location within the 3D scene based on 3D cursor location data;
   determining a distance between the object location and the 3D cursor location within the 3D scene;
   determining that the distance is less than a threshold distance; and automatically modifying geometric shape data of the 3D cursor displayed within the map viewport to surround the object in the 3D scene in response to determining that the distance between the object location and the 3D cursor location is less than the threshold distance.

2. The method of claim 1 wherein the modified 3D cursor geometric shape data surrounds a surface of the object to which the display within the map viewport will move when a user actuates a corresponding cursor positioning device.

3. The method of claim 1 further comprising identifying the object within the 3D scene from automatically modifying the geometric shape data of the 3D cursor.

4. The method of claim 1 further comprising informing a user that actuating a corresponding cursor positioning device will display a different view of the object within the map viewport from automatically modifying the geometric shape data of the 3D cursor.

5. The method of claim 1 further comprising superimposing a semi-transparent display of the object over a display of the 3D scene prior to a display of the object replacing the 3D scene display subsequent to automatically modifying the geometric shape data of the 3D cursor.

6. The method of claim 1 further comprising providing an indication that additional views of the object are available subsequent to automatically modifying the geometric shape data of the 3D cursor.

7. A computing device configured to automatically move a 3D cursor within a 3D scene displayed within a map viewport on a computing device, the computing device comprising:
a cursor positioning device;
a first routine stored on a memory including instructions that, when executed on a processor, receive data representative of a 3D scene via a computer network, wherein the 3D scene comprises a plurality of objects, the objects including location data and image data;
a second routine stored on a memory including instructions that, when executed on a processor, determines an object location within the 3D scene based on the received data;
a third routine stored on a memory including instructions that, when executed on a processor, determines a 3D cursor location within the 3D scene based on 3D cursor location data;
a fourth routine stored on a memory including instructions that, when executed on a processor, determines a distance between the object location and the 3D cursor location within the 3D scene;
a fifth routine stored on a memory including instructions that, when executed on a processor, determines that the distance is less than a threshold distance as the cursor positioning device positions the 3D cursor within the 3D scene; and
a sixth routine stored on a memory including instructions that, when executed on a processor, automatically modifies geometric shape data of the 3D cursor within the 3D map viewport to at least partially surround the identified object in the 3D scene in response to determining that the distance between the 3D cursor location and the object location is less than the threshold distance.

8. The computing device of claim 7 wherein the cursor positioning device is a 2D cursor positioning device.

9. The computing device of claim 7 further comprising automatically orienting the 3D cursor to a surface of the object to which the display within the map viewport will move when a user actuates the cursor positioning device.

10. The computing device of claim 7 wherein modifying the geometric shape data of the 3D cursor identifies the object within the 3D scene.

11. The computing device of claim 7 further comprising indicating to a user that actuating the cursor positioning device will display a different view of the object within the map viewport from automatically modifying geometric data of the 3D cursor.

12. The computing device of claim 7 further comprising superimposing a semi-transparent display of a view of the object over the display of the 3D scene prior to a display of the object replacing the 3D scene display subsequent to automatically modifying geometric shape data of the 3D cursor.

13. The computing device of claim 7 further comprising providing an indication that additional views of the object are available subsequent to automatically modifying geometric data of the 3D cursor.

14. A non-transitory computer-readable medium storing instructions for automatically moving a 3D cursor within a 3D scene displayed within a map viewport on a client computing device, the non-transitory computer-readable medium comprising:
a first routine including instructions that, when executed on a processor, cause the client computing device to receive data representative of a 3D scene via a computer network, wherein the 3D scene includes an object, the objects including location data and image data;
a second routine including instructions that, when executed on a processor, cause the client computing device to determine an object location within the 3D scene based on the received data;
a third routine including instructions that, when executed on a processor, cause the client computing device to determine a 3D cursor location within the 3D scene based on 3D cursor location data;
a fourth routine including instructions that, when executed on a processor, cause the client computing device to determine a distance between the object location and the 3D cursor location within the 3D scene;
a fifth routine including instructions that, when executed on a processor, cause the client computing device to determine that the distance is less than a threshold distance as the cursor positioning device positions the 3D cursor within the 3D scene; and
a sixth routine including instructions that, when executed on a processor, cause the client computing device to automatically modify geometric shape data of the 3D cursor within the 3D map viewport to at least partially surround the object in the 3D scene in response to determining that the distance between the 3D cursor location and the object location is less than the threshold distance.

15. The non-transitory computer-readable medium as in claim 14 wherein the 3D cursor comprises an arrow shaped object and a semi-transparent geometric shape.

16. The non-transitory computer-readable medium of claim 14 further comprising instructions to automatically orient the 3D cursor to a surface of the object to which the display within the map viewport will move when a user actuates the cursor positioning device.

17. The non-transitory computer-readable medium of claim 14 further comprising instructions to identify the object within the 3D scene from automatically modifying the geometric shape data of the 3D cursor.

18. The non-transitory computer-readable medium of claim 14 further comprising instructions to indicate that actuating a corresponding cursor positioning device will display a different view of the object within the map viewport from modifying the geometric shape data of the 3D cursor.

19. The non-transitory computer-readable medium of claim 14 further comprising instructions to superimpose a semi-transparent display of the object over a display of the 3D scene prior to a display of the object replacing the 3D scene display subsequent to automatically modifying the geometric shape data of the 3D cursor.

20. The non-transitory computer-readable medium of claim 14 further comprising instructions to provide an indication that additional views of the object are available subsequent to automatically modifying the geometric shape data of the 3D cursor.

* * * * *